(12) United States Patent
Bakker

(10) Patent No.: US 7,639,422 B2
(45) Date of Patent: Dec. 29, 2009

(54) DEVICE FOR GENERATING AN ARRAY OF LIGHT SPOTS

(75) Inventor: Levinus Pieter Bakker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 251 days.

(21) Appl. No.: 11/576,706

(22) PCT Filed: Sep. 28, 2005

(86) PCT No.: PCT/IB2005/053194

§ 371 (c)(1),
(2), (4) Date: Apr. 5, 2007

(87) PCT Pub. No.: WO2006/040701

PCT Pub. Date: Apr. 20, 2006

(65) Prior Publication Data

US 2008/0180800 A1    Jul. 31, 2008

(30) Foreign Application Priority Data

Oct. 11, 2004   (EP)   ................................ 04300672

(51) Int. Cl.
*G02B 5/18*  (2006.01)
*G02B 27/44*  (2006.01)
(52) U.S. Cl. ...................................... 359/566
(58) Field of Classification Search ................. 359/558, 359/565, 566, 569
See application file for complete search history.

(56) References Cited

U.S. PATENT DOCUMENTS 4,037,918 A  *  7/1977  Kato ........................... 359/29
5,124,843 A      6/1992  Leger et al.

OTHER PUBLICATIONS

Carreon E et al: "Analysis and Design of Pixelated Diffractive Elements", Proceedings of the SPIE—The International Society for Optical Engineering SPIE—Int. Soc. Opt. Eng USA, vol. 3951, pp. 241-249, 2000, XP002364729.
Hamam H: "Simplified Linear Formulation", Optics Communications, North-Holland Publishing Co. Amsterdam, NL, vol. 144, No. 1-3, pp. 89-98, 1997, XP004097938.
Barge M et al: "Array Illumators", Journal of Optics Masson Editeur France, vol. 27, No. 4, pp. 151-170, 1996, XP002364730.
Rojo-Velazquez G et al: "Description of Talbot Array Illuminators", Proceedings of the SPIE—The International Society for Optical Engineering SPIE—Int. Soc. Opt. Eng USA, vol. 3951, pp. 250-257, 2000, XP002364731.
ISR/Written Opinion of the International Searching Authority PCT/IB2005/053194.
By M.V. Berry et al. Entitled: Integer, Fractional and Fractal Talbot Effects; H.H. Wills Physics Laboratory, Bristol, England; Feb. 21, 1996 revision received Mar. 12, 1996; Journal of Modern Optics, 1996; vol., 43, No. 10,2139-2164; pp. 2139-2164.

* cited by examiner

*Primary Examiner*—Alessandro Amari

(57) ABSTRACT

The invention relates to a device for generating a periodical array of light spots from an input light beam, said device comprising—a periodical array of apertures (202) forming a plurality of interlaced sub-arrays of apertures,—phase shifter elements (PS;) placed in front of said apertures for imposing a phase shift to said input light beam so that each light spot is constructed as the superposition of a plurality of light spots generated by said plurality of interlaced sub-arrays of apertures. Use: Light spot generation.

11 Claims, 7 Drawing Sheets

DEVICE FOR GENERATING AN ARRAY OF LIGHT SPOTS

FIELD OF THE INVENTION

The invention relates to a device for generating an array of light spots.

The invention may be used in the field of optical storage.

BACKGROUND OF THE INVENTION

FIG. 1 depicts a known solution exploiting the Talbot effect for generating an array of light spots.

The array of light spots 101 is generated by an array of apertures 102 which exploits the Talbot effect. The Talbot effect is a diffraction phenomenon working as follows. When a coherent light beams, such as the input light beam 103, is applied to an object having a periodic diffractive structure (thus forming light emitters), such as the array of apertures 102, the diffracted light recombines into identical images of the emitters at a plane located at a predictable distance $z_t$ from the diffracting structure. This distance $z_t$ is known as the Talbot distance. The Talbot distance $z_t$ is given by the relation $z_t = 2 \cdot n_0 \cdot p^2 / \lambda$, where p is the periodic spacing of the light emitters, $\lambda$ is the wavelength of the input light beam, and $n_0$ is the refractive index of the propagation space.

More generally, re-imaging takes place at other distances $z_m$ spaced further from the emitters and which are a multiple of the Talbot distance z such that $z_m = 2 \cdot n_0 \cdot m \cdot p^2 / \lambda$, where m is an integer.

This known solution however has technical limitations since the intensity of the light spots cannot be high because just a few percents of the input light beam wave plane passes through the apertures.

OBJECT AND SUMMARY OF THE INVENTION

It is an object of the invention to propose a device for generating an array of light spots of higher intensity.

To this end, the device according to the invention for generating a periodical array of light spots from an input light beam comprises:

- a periodical array of apertures forming a plurality of interlaced sub-arrays of apertures,
- phase shifter elements placed in front of said apertures for imposing a phase shift to said input light beam so that each light spot is constructed as the superposition of a plurality of light spots generated by said plurality of interlaced sub-arrays of apertures.

This device exploits the fact that the light spots generated by the plurality of interlaced sub-arrays of apertures may be added up coherently.

To this end, the phase shifter elements are used to laterally displacing the plurality of light spots generated by said plurality of interlaced sub-arrays of apertures, so that this plurality of light spots overlaps for constructing a single light spot. As a consequence, and compared to the prior art solution, each light spot has a higher intensity.

The number of interlaced sub-arrays of apertures may be freely chosen so that the intensity of each light spot may also be freely chosen.

Moreover, for a given distance between the array of apertures and the array of light spots, the array of apertures contains more apertures, so that the light transmission factor is improved.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

In the following, although the invention applies to a two-dimensional array of apertures, the device according to the invention is described based on a one-dimensional array of apertures, for sake of understanding.

Figure 1:
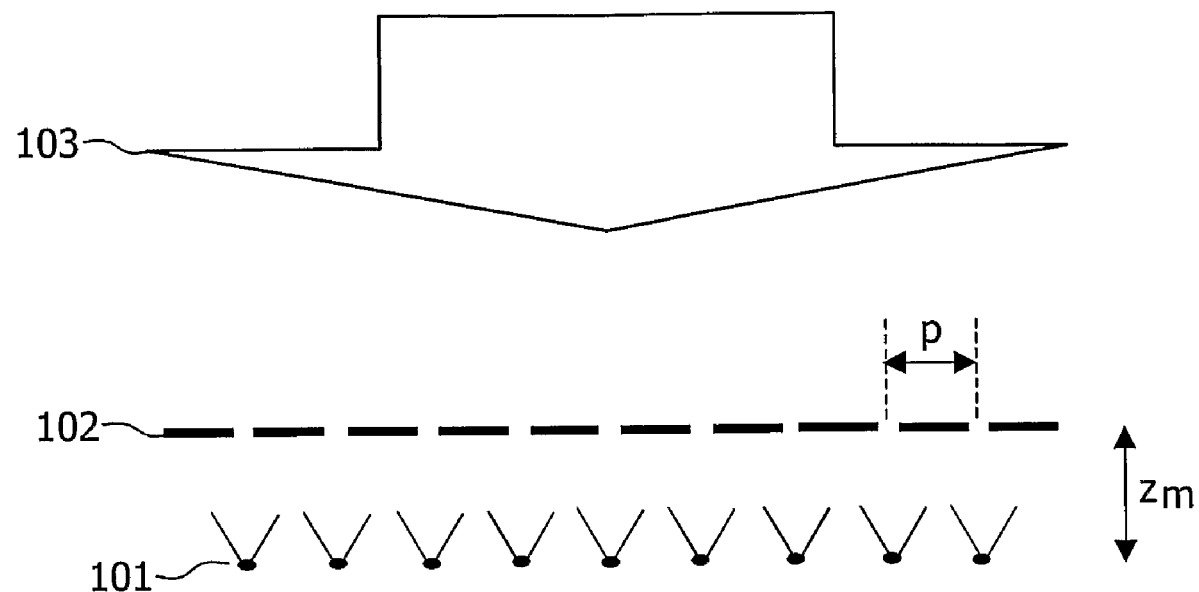
FIG. 1 depicts a known system for generating an array of light spots.
Figure 2:
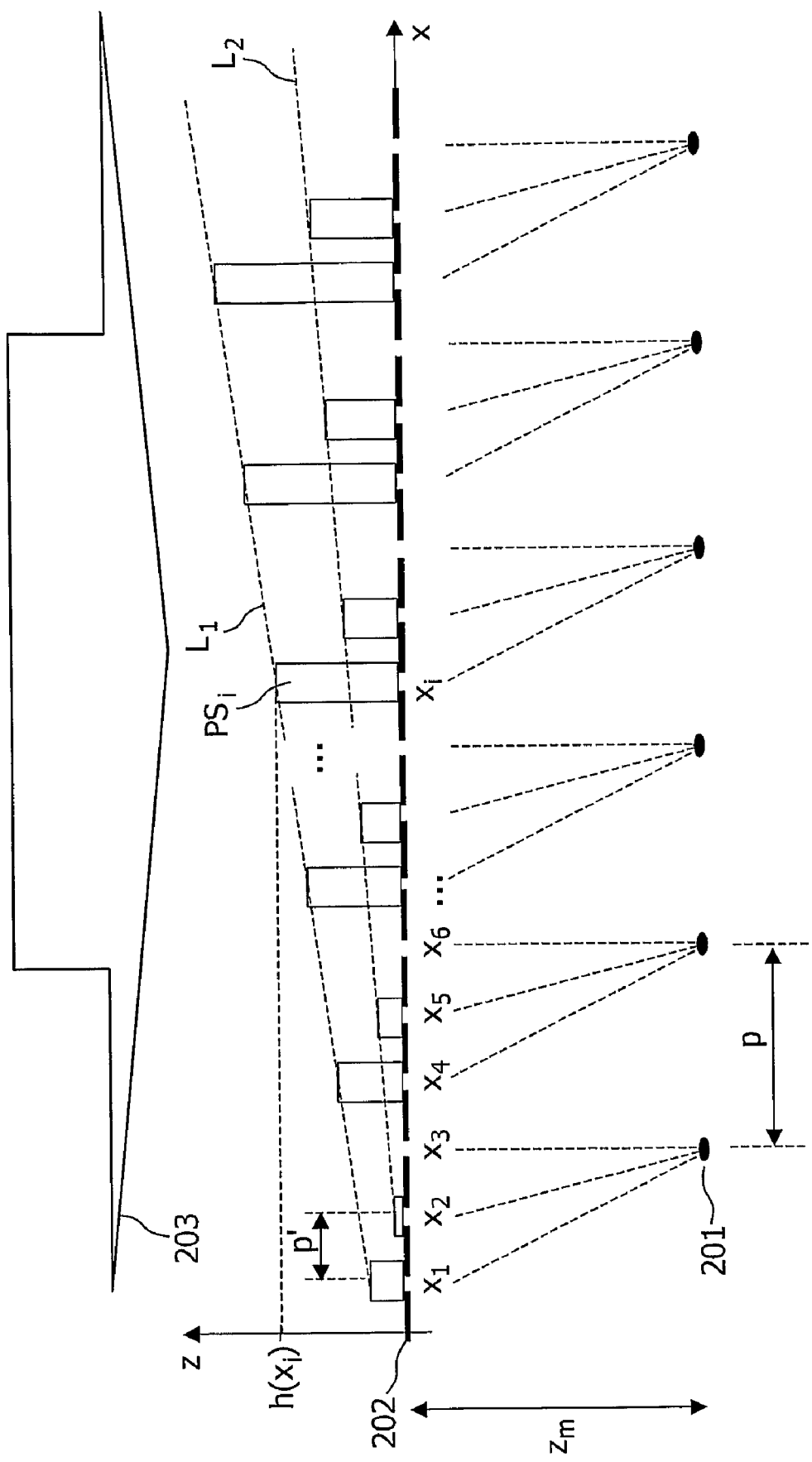
FIG. 2 depicts a first embodiment of a device according to the invention for generating a periodical array of light spots.

FIG. 2 depicts a first embodiment of a device according to the invention for generating a periodical array of light spots 201 having a first period p, from an input light beam 203 (e.g. a laser beam), in exploiting the Talbot effect.

The array of light spots 201 is generated at a distance $z_m = 2 \cdot n_0 \cdot m \cdot p^2 / \lambda$ from the array of apertures, where no is the refractive index of the propagation space, $\lambda$ is the wavelength of the input light beam, and m is an integer. The array of apertures 202 comprises apertures having a second period p'. The apertures may be for example circular, but various shapes would also fit.

The array of apertures 202 is formed by N interlaced sub-arrays of apertures:

a $1^{st}$ sub-array of apertures having apertures at position $x_{N(i-1)+1}$, a $2^{nd}$ sub-array of apertures having apertures at position $x_{N(i-1)+2}$,

...

a $k^{th}$ sub-array of apertures having apertures at position $x_{N(i-1)+k}$,

...

a $N^{th}$ sub-array of apertures having apertures at position $x_{N(i-1)+N}$.

where $i_{max}$ is the number of apertures per sub-array along direction x, i is an integer index varying between 1 and $i_{max}$.

In the embodiment of FIG. 2, and for sake of understanding, N=3 so that the array of apertures 202 is equivalent to three interlaced sub-arrays of apertures:

a $1^{st}$ sub-array of apertures having apertures at position $x_{3(i-1)+1}$, a $2^{nd}$ sub-array of apertures having apertures at position $x_{3(i-1)+2}$, a $3^{rd}$ sub-array of apertures having apertures at position $x_{3(i-1)+3}$.

where i is an integer index varying between 1 and 3.

The device according to the invention also comprises phase shifter elements $PS_i$ placed in front of the apertures. Each phase shifter element $PS_i$ (for i=1 ... $i_{max}$) is placed at a lateral position $x_i$ such that $(x_{i+1} - x_i) = p' = p/N$.

The phase shifter elements impose a phase shift to the input light beam so that each light spot is constructed as the superposition of a plurality of light spots generated by said plurality of interlaced sub-arrays of apertures.

For example, the first light spot to the left shown on FIG. 2 results from the superposition of a first light spot generated by the $1^{st}$ sub-array of apertures having apertures at position $x_{3(i-1)+1}$, of a second light spot generated by the $2^{nd}$ sub-array of apertures having apertures at position $x_{3(i-1)+2}$, and of a third light spot generated by the $3^{rd}$ sub-array of apertures having apertures at position $x_{3(i-1)+3}$, as symbolized by three doted lines converging from these three sub-array of apertures toward said first light spot. The same applies for the construction of other light spots.

It can be shown that in order to make a light spot which is constructed as the superposition of a plurality of light spots generated by a plurality of interlaced sub-arrays of apertures, the phase shifter elements $PS_i$ placed in front of the $k^{th}$ sub-array of apertures have to define a linear phase shift $\phi_k(x_{N\cdot(i-1)+k})$ along the lateral direction x as follows:

$$\phi_k(x_{N\cdot(i-1)+k}) = \frac{2\pi \cdot (N-k)}{2 \cdot m \cdot N \cdot p} \cdot x_{N\cdot(i-1)+k} \quad (1)$$

for $k = 1 \ldots N$, for $i = 1 \ldots i_{max}$.

It is noted that (1) results in a null phase shift for phase shifter elements $PS_i$ associated to the sub-array of apertures having apertures vertically facing the light spots (i.e. sub-array of apertures of rank N in this example).

The linear phase shift may be performed by varying the height $h(x_{(N-1)\cdot i+k})$ of the phase shifter elements $PS_i$ associated to the $k^{th}$ sub-array of apertures as follows:

$$h(x_{N\cdot(i-1)+k}) = \frac{\lambda}{2\pi \cdot (n-n_0)} \cdot \phi_k(x_{N\cdot(i-1)+k}) \quad (2)$$

$$h(x_{N\cdot(i-1)+k}) = \frac{\lambda}{(n-n_0)} \cdot \frac{(N-k)}{2 \cdot m \cdot N \cdot p} \cdot x_{N\cdot(i-1)+k}$$

where n is the refractive index of the phase shifter elements.

for $k=1 \ldots N$, for $i=1 \ldots i_{max}$.

The height of phase shifter elements $PS_i$ is thus linearly increased along the lateral direction x, as illustrated by the linear lines $L_1$ and $L_2$.

Each phase shifter element $PS_i$ corresponds to a rectangle made of a transparent material (e.g. plastic) placed in front of a single aperture.

Alternatively, but not shown on FIG. 3, the linear phase shift may be performed by defining phase shifter elements $PS_i$ with a transparent material (e.g. Liquid Crystal cells) having a refractive index $n_{k,i}$ varying linearly with the lateral position, while keeping constant their height $h_0$, the refractive index $n_{k,i}$ being defined as follows:

$$n_{k,i} = n_0 + \frac{\lambda}{h_0} \cdot \frac{(N-k)}{2 \cdot m \cdot N \cdot p} \cdot x_{N\cdot(i-1)+k} \quad (3)$$

Of course, the combination of phase shifter elements $PS_i$ having linearly varying height and linearly varying refractive index could also be considered.

Advantageously, a phase offset $\varphi_k$ is added to the phase term $\phi_k(x_{N\cdot(i-1)+k})$ of the $k^{th}$ sub-array of apertures as follows:

$$\phi_k(x_{N\cdot(i-1)+k}) = \frac{2\pi \cdot (N-k)}{2 \cdot m \cdot n_0 \cdot N \cdot p} \cdot x_{N\cdot(i-1)+k} + \varphi_k \quad (4)$$

This phase offset may be used to ensure that the light contribution from the sub-aperture arrays are adding up as coherent as possible. Varying the phase offset $\varphi_k$ may thus be used to make the intensity of the light spots more uniform.

Figure 3:
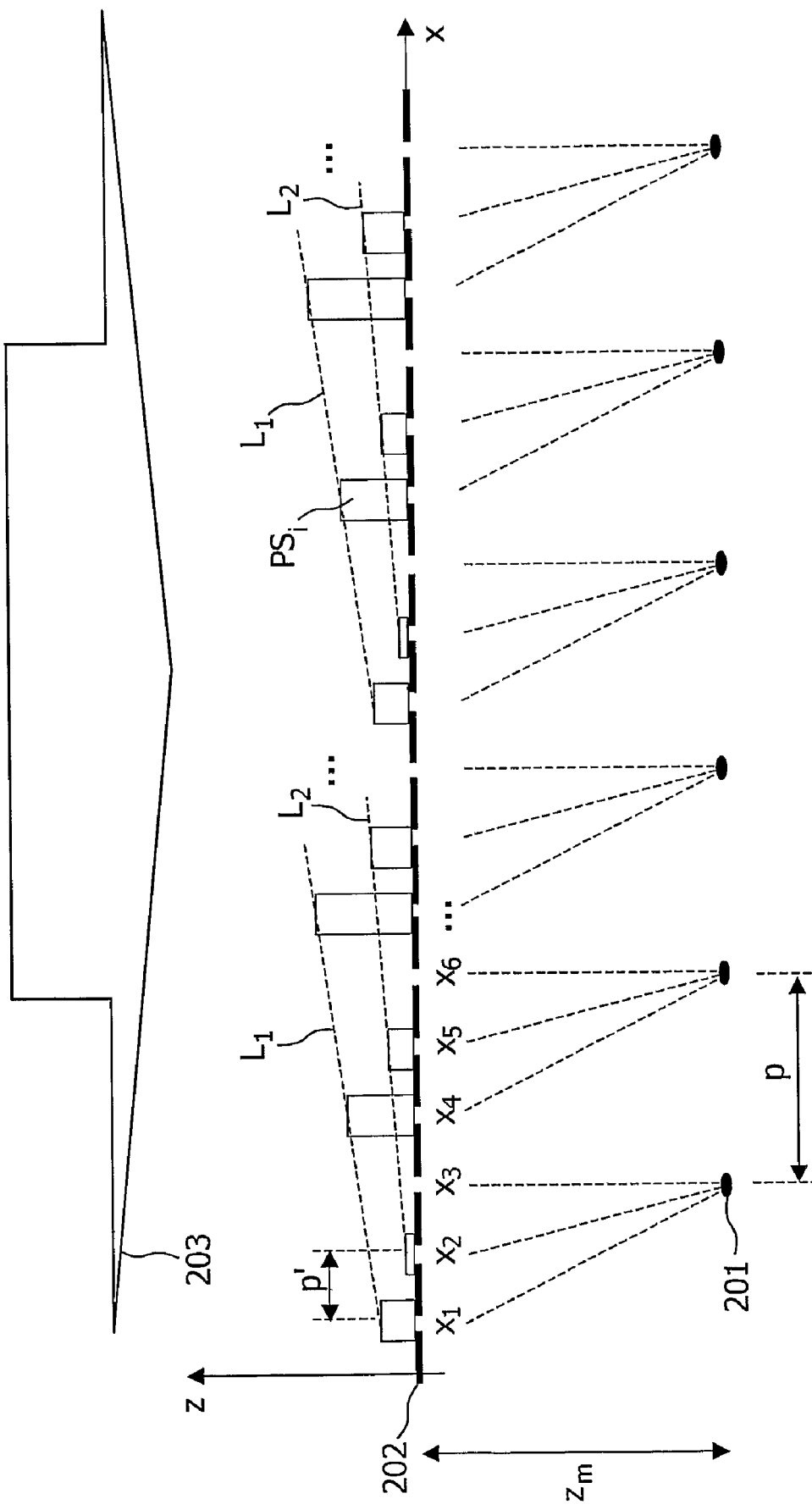
FIG. 3 depicts a second embodiment of a device according to the invention for generating a periodical array of light spots.

FIG. 3 depicts a second embodiment of a device according to the invention for generating a periodical array of light spots.

It differs from FIG. 2 in that relation (1) is given modulo $2\pi$ (i.e $\alpha+2\pi*j=\alpha$, with j integer and $0 \leq \alpha < 2\pi$) so that the height of the phase shifter elements $PS_i$ increases linearly by pieces, resulting in a device with an reduced height.

Figure 4:
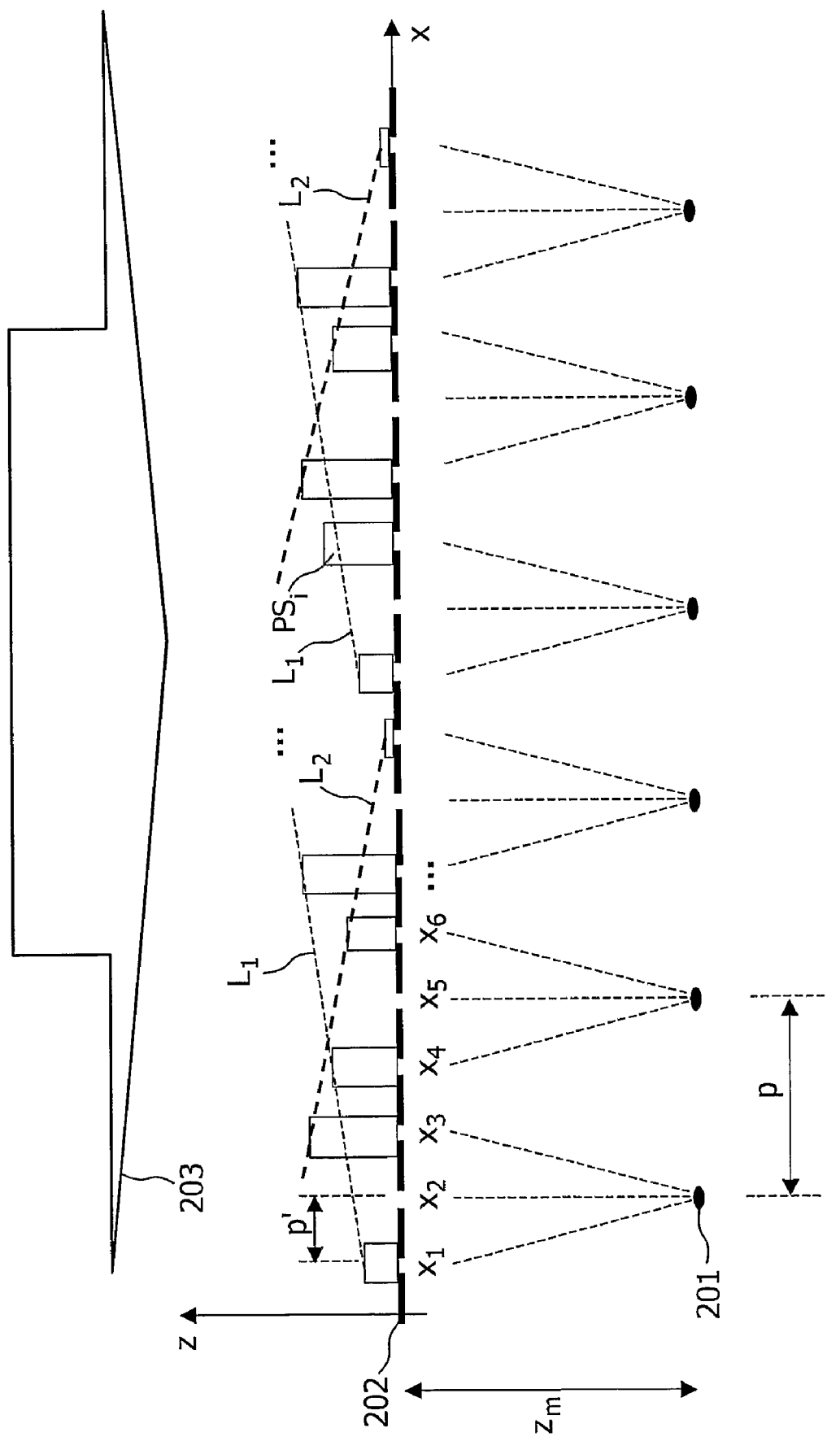
FIG. 4 depicts a third embodiment of a device according to the invention for generating a periodical array of light spots.

FIG. 4 depicts a third embodiment of a device according to the invention for generating a periodical array of light spots.

It differs from FIG. 3 in that each light spot is generated by three sub-arrays of apertures, two sub-arrays of apertures being arranged symmetrically around the lateral position of the light spot. Of course, a different odd number of sub-arrays of apertures could be chosen.

The light phase shifter elements $PS_i$, according to their height reflecting the phase shift to be imposed, either perform a positive or a negative lateral shift.

Figure 5:
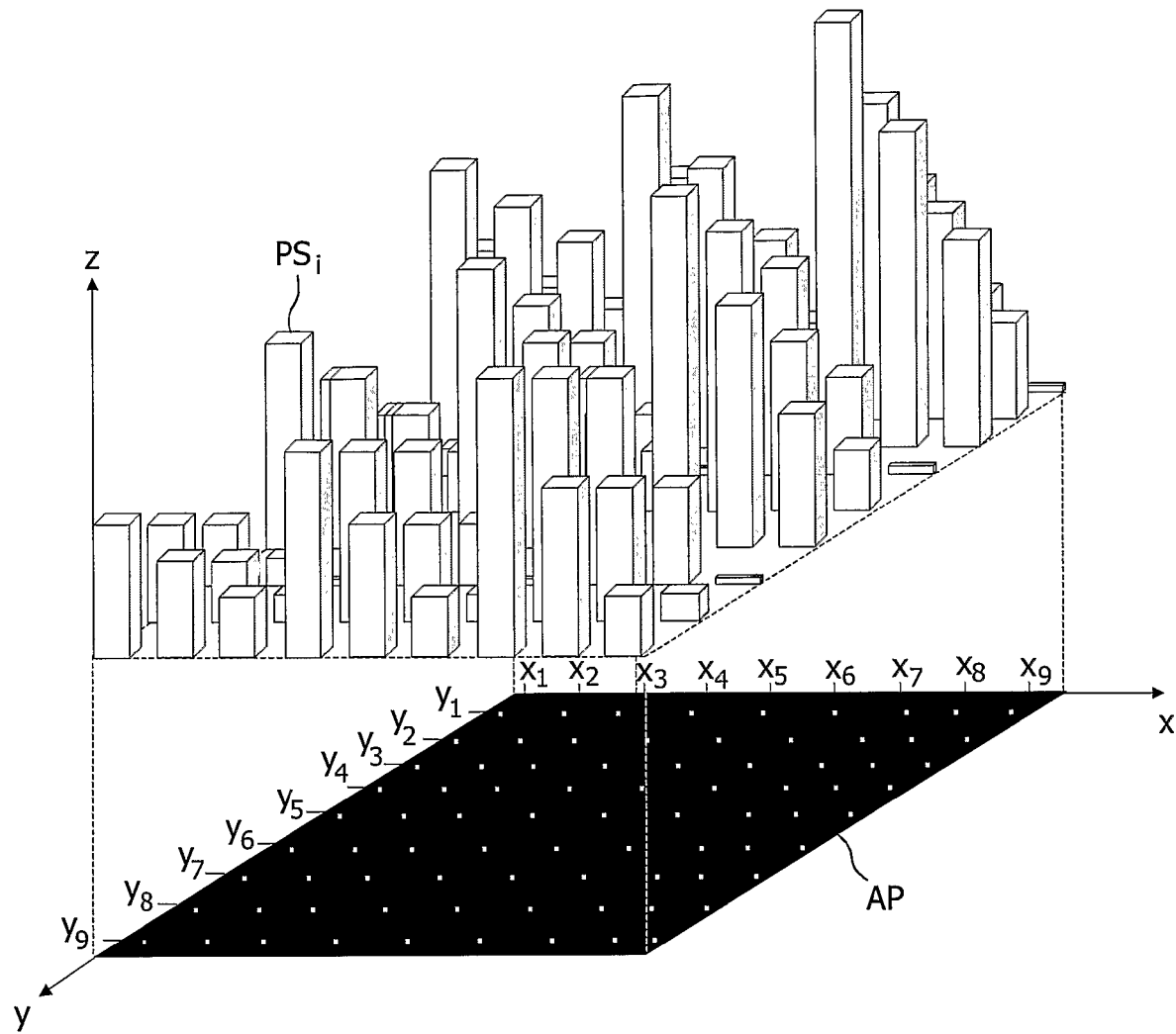
FIG. 5 illustrates by an example a three-dimensional view of a device according to the invention for generating a periodical array of light spots.

FIG. 5 illustrates by an example a three-dimensional view of a device according to the invention for generating a periodical array of light spots.

This device comprises a periodical array of apertures AP forming a plurality of interlaced sub-arrays of apertures. The apertures are shown by white dots.

This device also comprises phase shifter elements $PS_i$ placed in front of said apertures for imposing a phase shift to said input light beam so that each light spot is constructed as the superposition of a plurality of light spots generated by said plurality of interlaced sub-arrays of apertures.

In this example, the height $h(x_i,y_i)$ in the z direction of the phase shifter elements $PS_i$ at position $(x_i,y_i)$ is given by the following table:

|       | $x_1$ | $x_2$ | $x_3$ | $x_4$ | $x_5$ | $x_6$ | $x_7$ | $x_8$ | $x_9$ |
|-------|-------|-------|-------|-------|-------|-------|-------|-------|-------|
| $y_1$ | 4     | 3     | 2     | 6     | 4     | 2     | 8     | 5     | 2     |
| $y_2$ | 3     | 2     | 1     | 5     | 3     | 1     | 7     | 4     | 1     |
| $y_3$ | 2     | 1     | 0     | 4     | 2     | 0     | 6     | 3     | 0     |
| $y_4$ | 6     | 5     | 4     | 8     | 6     | 4     | 10    | 7     | 4     |
| $y_5$ | 4     | 3     | 2     | 6     | 4     | 2     | 8     | 5     | 2     |
| $y_6$ | 2     | 1     | 0     | 4     | 2     | 0     | 6     | 3     | 0     |
| $y_7$ | 8     | 7     | 6     | 10    | 8     | 6     | 12    | 9     | 6     |
| $y_8$ | 5     | 4     | 3     | 7     | 5     | 3     | 9     | 6     | 3     |
| $y_9$ | 2     | 1     | 0     | 4     | 2     | 0     | 6     | 3     | 0     |

This table puts in evidence that the phase shifter elements is defined by phase shift elements having a height varying linearly and locally either along direction x and direction y.

Figure 6:
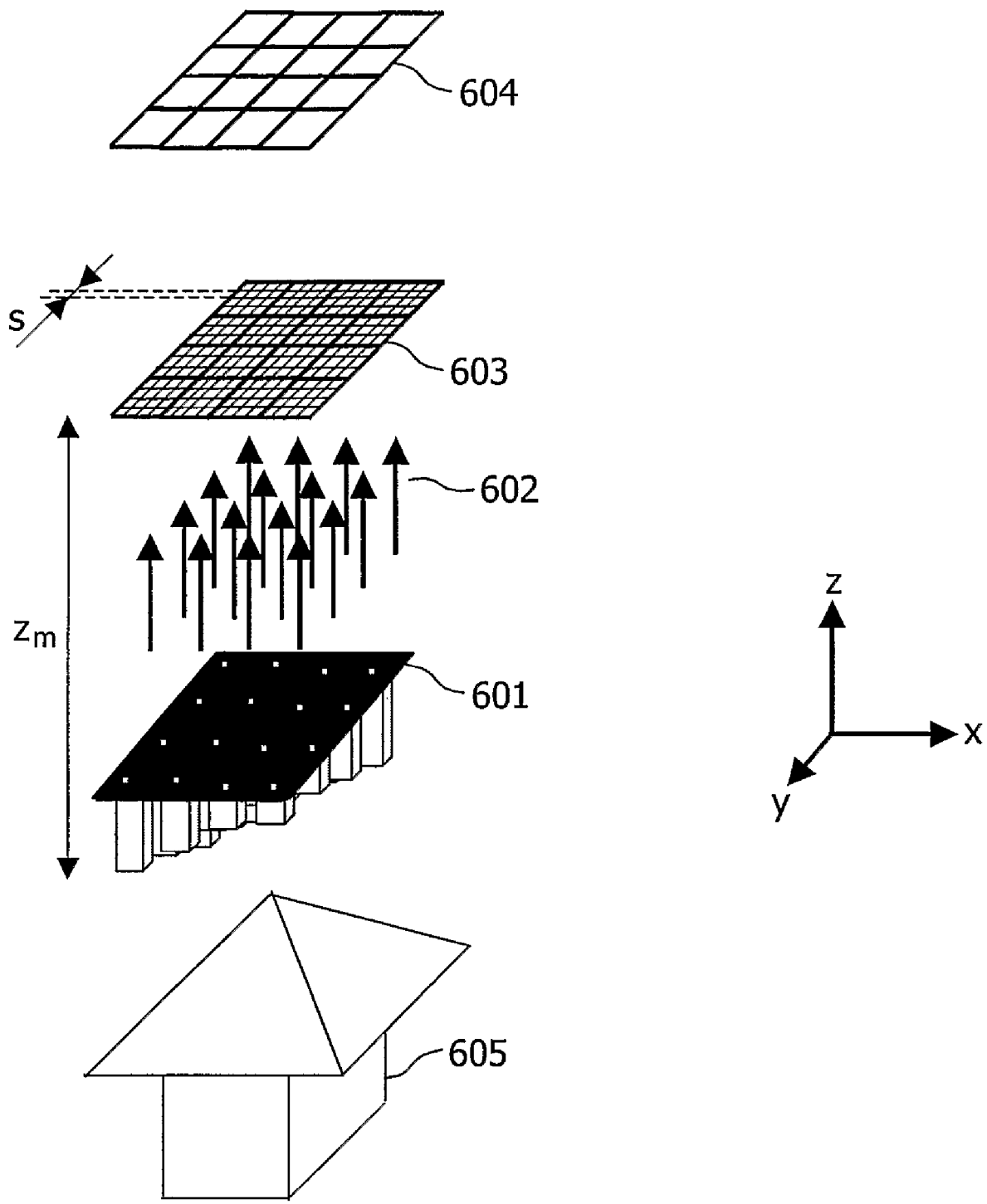
FIG. 6 depicts a system implementing a device according to the invention.

FIG. 6 depicts a three-dimensional view of a system using a device 601 according to the invention for generating a periodical array of light spots 602 from an input light beam 605.

This system comprises an information carrier 603. The information carrier comprises a set of square adjacent elementary data areas having size referred to as s and arranged as in a matrix. Data are coded on each elementary data area via the use of a material intended to take different transparency levels, for example two levels in using a material being transparent or non-transparent for coding a 2-states data, or more generally N transparency levels (for example N being an integer power of 2 for coding a $^2\log(N)$-states data).

Each light spot of the array of light spots 602 is intended to be successively applied to an elementary data area, for example using an actuator in charge of two-dimensionally translating the device 601. According to the transparency state of said elementary data areas, the light spot is transmitted (not at all, partially or fully) to a CMOS or CCD detector 604 comprising pixels intended to convert the received light signal, so as to recover the data stores on said elementary data area.

Figure 7:
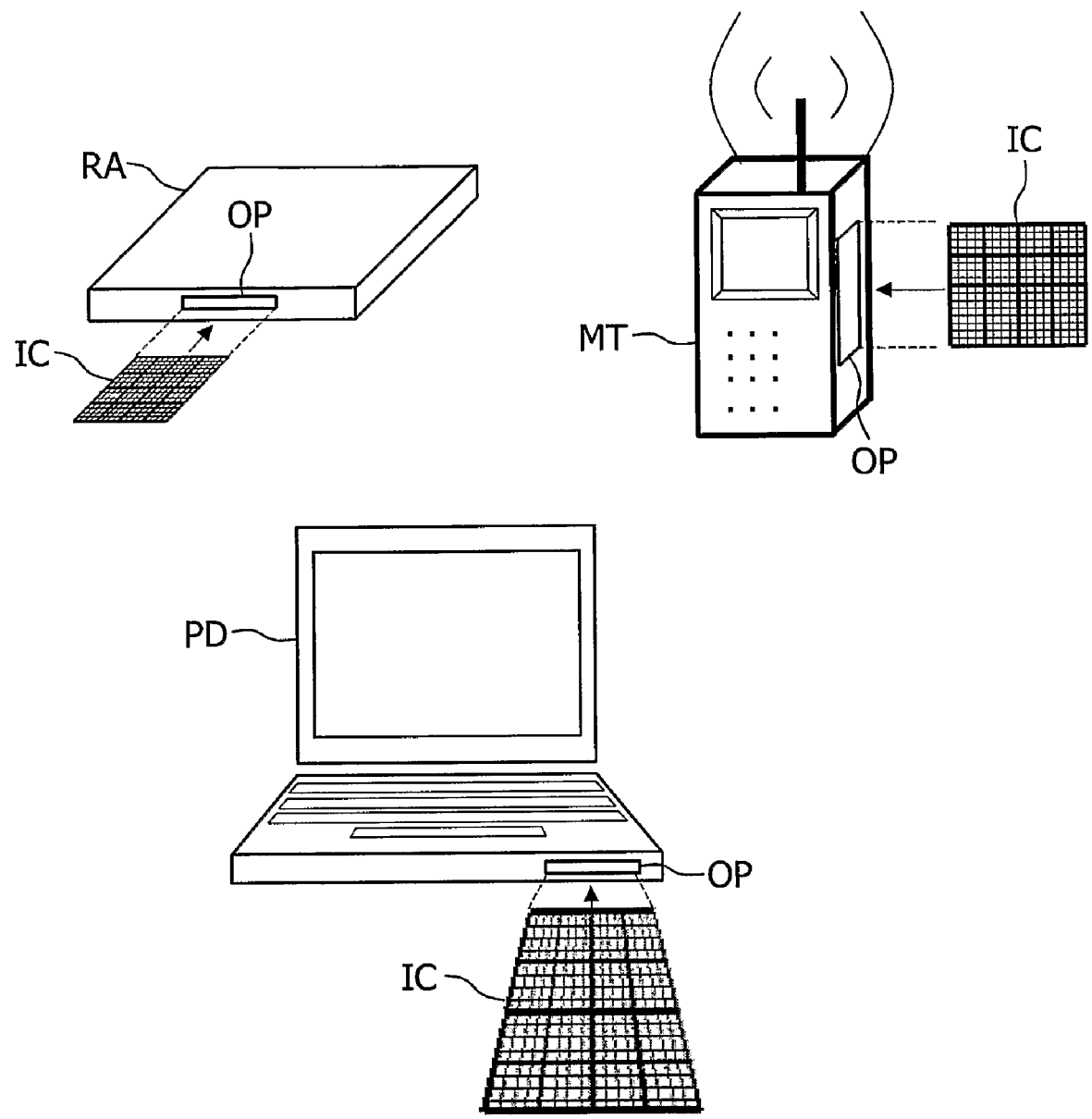
FIG. 7 illustrates various apparatus using a system as depicted by FIG. 6.

As illustrated in FIG. 7, the system depicted by FIG. 4 may advantageously be implemented in a reading apparatus RA (e.g. home player apparatus . . . ), a portable device PD (e.g. portable digital assistant, portable computer, a game player unit . . . ), or a mobile telephone MT. These apparatus and devices comprise an opening (OP) intended to receive an information carrier IC to which is intended to be applied the array of light spots, in view of for reading/writing data.

Use of the verb "comprise" and its conjugations does not exclude the presence of elements or steps other than those stated in the claims. Use of the article "a" or "an" preceding an element or step does not exclude the presence of a plurality of such elements or steps.

The invention claimed is:

1. A device for generating a periodical array of light spots from an input light beam, said device comprising:
a periodical array of apertures (202) forming a plurality of interlaced sub-arrays of apertures, each sub-array of apertures being arranged to diffract light to generate an array of light spots in a plane located an integer multiple of the Talbot distance from the respective sub-array; and
phase shifter elements ($PS_i$) placed in front of said apertures for imposing a phase shift to said input light beam so that each light spot generated by the device is constructed as the superposition of a plurality of said light spots generated by said plurality of interlaced sub-arrays of apertures, wherein said phase-shifter elements comprise elements of linearly varying height among corresponding elements associated with each of said sub-arrays.

2. A device as claimed in claim 1, wherein said phase shifter elements ($PS_i$) define a linear phase shift.

3. A device as claimed in claim 2, wherein said linear phase shift is expressed modulo $2\pi$.

4. A device as claimed in claim 1, wherein said phase shifter elements ($PS_i$) comprise elements of linearly varying refractive index.

5. A device as claimed in claim 1, wherein said phase shifter elements ($PS_i$) are arranged to laterally displace the plurality of light spots generated by said plurality of interlaced sub-arrays of apertures so that each light spot of the device is constructed as said superposition of the plurality of light spots.

6. A device as claimed in claim 1, wherein one of the sub-arrays has apertures vertically facing the light spots formed by the device, the phase shifter elements ($PS_i$) associated with that sub-array providing a null phase shift.

7. A device as claimed in claim 1, wherein said periodical array of apertures (202) is formed by N interlaced sub-arrays of apertures, the periodical array of apertures (202) having a period p', and the periodical array of light spots generated by the device having a period p, where p'=p/N.

8. A device as claimed in claim 7, wherein said phase shifter elements ($PS_i$) are placed at lateral positions $x_i$ such that $(x_{i+1}-x_i)=p'$, where i is an integer index varying between 1 and $i_{max}$.

9. A portable device comprising a device comprising:
a periodical array of apertures (202) forming a plurality of interlaced sub-arrays of apertures, each sub-array of apertures being arranged to diffract light to generate an array of light spots in a plane located an integer multiple of the Talbot distance from the respective sub-array; and
phase shifter elements ($PS_i$) placed in front of said apertures for imposing a phase shift to said input light beam so that each light spot generated by the device is constructed as the superposition of a plurality of said light spots generated by said plurality of interlaced sub-arrays of apertures, wherein said phase-shifter elements comprise elements of varying height, said height varying linearly among corresponding elements associated with each of said sub-arrays.

10. A mobile telephone comprising a device comprising:
a periodical array of apertures (202) forming a plurality of interlaced sub-arrays of apertures, each sub-array of apertures being arranged to diffract light to generate an array of light spots in a plane located an integer multiple of the Talbot distance from the respective sub-array; and
phase shifter elements ($PS_i$) placed in front of said apertures for imposing a phase shift to said input light beam so that each light spot generated by the device is constructed as the superposition of a plurality of said light spots generated by said plurality of interlaced sub-arrays of apertures, wherein said phase-shifter elements comprise elements of varying height said height varying linearly among corresponding elements associated with each of said sub-arrays.

11. A game player unit comprising a device comprising:
a periodical array of apertures (202) forming a plurality of interlaced sub-arrays of apertures, each sub-array of apertures being arranged to diffract light to generate an array of light spots in a plane located an integer multiple of the Talbot distance from the respective sub-array; and
phase shifter elements ($PS_i$) placed in front of said apertures for imposing a phase shift to said input light beam so that each light spot generated by the device is constructed as the superposition of a plurality of said light spots generated by said plurality of interlaced sub-arrays of apertures, wherein said phase-shifter elements comprise elements of varying height, said height varying linearly among corresponding elements associated with each of said sub-arrays.

* * * * *